UNITED STATES PATENT OFFICE.

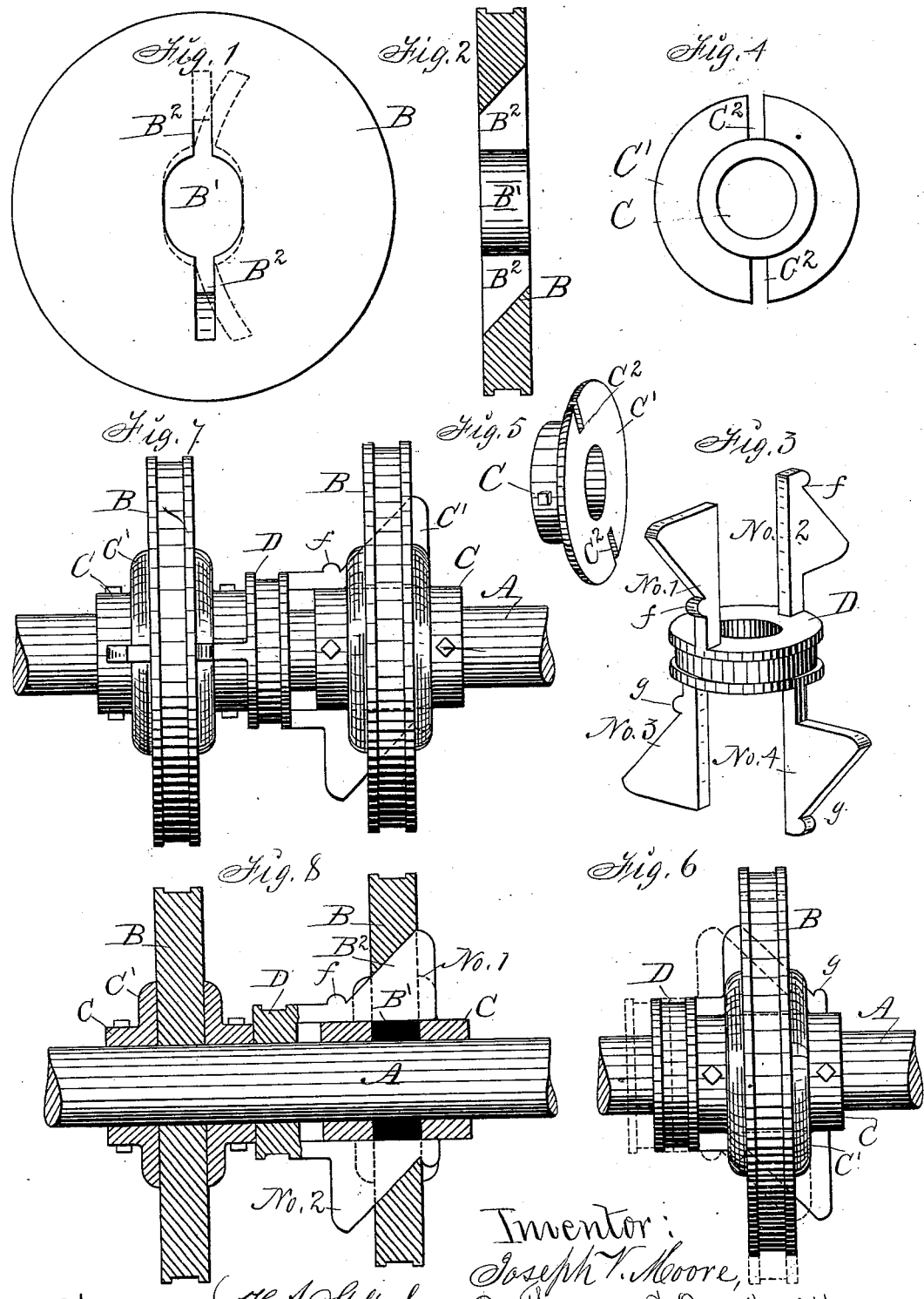

JOSEPH V. MOORE, OF DES MOINES, IOWA, ASSIGNOR OF ONE-HALF TO H. C. ENSMINGER, OF SAME PLACE.

REVERSING-GEAR FOR ENGINES.

SPECIFICATION forming part of Letters Patent No. 282,753, dated August 7, 1883.

Application filed April 19, 1883. (No model.)

*To all whom it may concern:*

Be it known that I, JOSEPH V. MOORE, of Des Moines, in the county of Polk and State of Iowa, have invented a new Mechanical Movement for Reversing the Motion of a Steam-Engine and the Direction of a Locomotive, of which the following is a specification.

My invention consists in forming and combining an adjustable disk, two fixed collars, and a sliding collar carrying cams with a rotating shaft, as hereinafter fully set forth, in such a manner that the disk can be readily placed and retained in an eccentric position relative to the shaft, to perform the function of an eccentric or crank in transmitting motion and power to the shaft from the pitman and piston of an engine by simply moving the sliding collar and cams relative to the adjustable disk and fixed collars.

Heretofore an adjustable disk and a sliding collar having grooves and carrying wedges or cams have been combined upon a shaft provided with longitudinal feathers to engage the grooves in the sliding collar, and transverse shoulders to engage the side faces of the disk; but forming feathers on a shaft to prevent the sliding collar from rotating, and shoulders to prevent the disk from sliding, is objectionable, and I accomplish the results contemplated by combining a disk, fixed collars, and a sliding collar having cams with a plain and solid shaft that is not impaired by forming transverse grooves in its surface to produce shoulders.

Figure 1 of my accompanying drawings is a side view of my adjustable disk, and Fig. 2 a transverse section of the same. Fig. 3 is a perspective view of my sliding collar, having duplex cams formed integral therewith. Fig. 4 is a view of the inside face, and Fig. 5 a perspective view of a collar having slots in its edges, adapting it to be combined with my adjustable disk and sliding collar having cams, when placed upon a shaft. Fig. 6 shows all the parts combined with a shaft as required for use with a single-piston engine. Fig. 7 shows two disks combined upon a shaft with one sliding collar having cams at its opposite ends, as required for use with a double-piston engine. Fig. 8 is a longitudinal section of Fig. 7. Jointly considered, these figures clearly illustrate the construction and operation of my complete invention.

A represents a rotating shaft or axle designed to be operated by means of a crank and pitman.

B is my adjustable disk, attached to the shaft A by means of collars in such a manner that it can move at right angles or laterally relative to the shaft, but not longitudinally. B' is an elongated opening in the center of the disk, through which the shaft extends.

$B^2$ are slots that extend outward (straight or curved) from opposite sides of the opening B', and terminate with parallel faces that incline relative to the axis of the disk, as clearly shown in Fig. 2. A continuous groove in the periphery of the disk adapts it for flexibly connecting therewith a valve by means of an eccentric strap and rod.

C C are collars, fixed to the shaft A on opposite sides of the disks B by means of set-screws, as required, to prevent the adjustable disks from moving longitudinally relative to the shaft. These collars have flanges C' and slots $C^2$ extending inward from the opposite edges and sides of the flanges, to coincide with the slots $B^2$ in the disks.

D is a collar adapted to fit and slide upon the shaft, and has a continuous groove in its periphery, to facilitate the attachment of a lever for moving the collar back and forth upon the shaft.

Nos. 1 and 2 are cams formed on or fixed to the side faces of the collar D. They are adapted in size and shape to fit and move in the slots $B^2$, formed in the disks B. Their inside edges are parallel with each other and the shaft A, and their outside edges incline in opposite directions, and parallel with each other and the inclined faces at the outer ends of the slots $B^2$, through which they extend. Nos. 3 and 4 are cams of corresponding size and shape on the opposite side of the collar, but in a right-angled position thereto, as required to operate two disks upon one shaft.

*f* and *g* are shoulders formed at the inner ends of the inclined faces of the outside edges of the cams Nos. 1, 2, 3, and 4, to engage the side faces of the disks B, as clearly shown in Fig. 8, for the purpose of restricting the sliding motion of the collar and cams.

In the practical use of my mechanical movement thus constructed, it is obvious that a longitudinal movement of the sliding collar relative to the shaft will project the reversely-inclined faces of the cams carried by the collar against the reversely-inclined faces of the slots in the disk, and thereby move the disk laterally relative to the shaft, and into an eccentric position on the shaft; and it is also obvious that the fixed flanged collars aside of the disk, and that have slots through which the cams extend, will perform the function of a spline, and prevent the sliding collar and adjustable disk from rotating upon the shaft, and that consequently the disks, when in eccentric position upon the shaft, will be locked to the shaft, as required to perform the function of an eccentric, in operating the valve of an engine or locomotive, that is flexibly connected with the periphery of the adjustable disk.

I claim as my invention—

A disk, B, having an elongated opening, B', and slots B², collars C, having flanges C' and slots C², a sliding collar, D, having cams projecting laterally, and adapted to move in the slots of the disk, and the fixed collars arranged and combined upon a solid rotating shaft, substantially as shown and described, to operate in the manner set forth, for the purposes specified.

JOSEPH V. MOORE.

Witnesses:
THOMAS G. ORWIG,
H. A. STOLTENBERG.